(12) United States Patent
Rothschild

(10) Patent No.: US 7,924,979 B2
(45) Date of Patent: Apr. 12, 2011

(54) SCATTER ATTENUATION TOMOGRAPHY

(75) Inventor: Peter J. Rothschild, Newton, MA (US)

(73) Assignee: American Science and Engineering, Inc., Billerica, MA (US)

( * ) Notice: Subject to any disclaimer, the term of this patent is extended or adjusted under 35 U.S.C. 154(b) by 0 days.

(21) Appl. No.: 12/551,972

(22) Filed: Sep. 1, 2009

(65) Prior Publication Data

US 2010/0034347 A1 Feb. 11, 2010

Related U.S. Application Data

(63) Continuation-in-part of application No. 12/489,620, filed on Jun. 23, 2009, now abandoned, which is a continuation of application No. 11/843,185, filed on Aug. 22, 2007, now Pat. No. 7,551,718.

(60) Provisional application No. 60/823,328, filed on Aug. 23, 2006.

(51) Int. Cl.
*G01N 23/201* (2006.01)
(52) U.S. Cl. .......................................................... 378/88
(58) Field of Classification Search .................. 378/86, 378/87, 88, 89
See application file for complete search history.

(56) References Cited

U.S. PATENT DOCUMENTS

| | | | |
|---|---|---|---|
| 2,670,401 A | 2/1954 | Weinberg | |
| RE28,544 E | 9/1975 | Stein et al. | 250/369 |
| 3,955,089 A | 5/1976 | McIntyre | 250/399 |
| 4,002,917 A | 1/1977 | Mayo | 250/445 T |
| 4,144,457 A | 3/1979 | Albert | 250/445 |
| 4,149,076 A | 4/1979 | Albert | 250/402 |
| 4,194,123 A | 3/1980 | Wittry | 250/492 |
| 4,196,351 A | 4/1980 | Albert | 250/416 TV |
| 4,357,535 A | 11/1982 | Haas | 378/57 |
| 4,535,243 A | 8/1985 | Peschmann | 250/363 |
| 4,598,415 A | 7/1986 | Luccio et al. | 378/119 |
| 4,672,615 A | 6/1987 | Kelly et al. | 372/2 |
| 4,694,457 A | 9/1987 | Kelly et al. | 372/2 |
| 4,730,350 A | 3/1988 | Albert | 378/10 |
| 4,799,247 A | 1/1989 | Annis et al. | 378/87 |
| 4,864,142 A | 9/1989 | Gomberg | 250/390.04 |

(Continued)

FOREIGN PATENT DOCUMENTS

DE 26 39 631 3/1998

(Continued)

OTHER PUBLICATIONS

Harding, G., "*On the Sensitivity and Application Possibilities of a Novel Compton Scatter Imaging System*", IEEE Transactions on Nuclear Science, vol. NS-29, Nov. 3, Jun. 1982, pp. 1260-1265.

(Continued)

*Primary Examiner* — Chih-Cheng G Kao
(74) *Attorney, Agent, or Firm* — Sunstein Kann Murphy & Timbers LLP

(57) ABSTRACT

A system and methods for characterizing an inspected object on the basis of attenuation determined from pair-wise illuminated voxels. A beam of penetrating radiation characterized by a propagation direction and an energy distribution is scanned relative to an object, while scatter detectors with collimated fields-of-view detect radiation scattered by each voxel of the inspected object that is intercepted by the incident beam of penetrating radiation. By calculating the attenuation of penetrating radiation between pairs of voxels illuminated sequentially by the incident beam, a tomographic image is obtained characterizing the three-dimensional distribution of attenuation in the object of one or more energies of penetrating radiation, and thus of various material characteristics.

20 Claims, 14 Drawing Sheets

U.S. PATENT DOCUMENTS

| | | | |
|---|---|---|---|
| 4,868,856 A | 9/1989 | Frith et al. | 378/86 |
| 4,884,289 A | 11/1989 | Glockmann et al. | 378/87 |
| 5,022,062 A | 6/1991 | Annis | 378/86 |
| 5,097,492 A | 3/1992 | Baker et al. | 378/22 |
| 5,153,900 A | 10/1992 | Nomikos et al. | 378/65 |
| 5,179,581 A | 1/1993 | Annis | 378/86 |
| 5,181,234 A | 1/1993 | Smith | 378/87 |
| 5,182,764 A | 1/1993 | Peschmann et al. | 378/57 |
| 5,247,561 A | 9/1993 | Kotowski | 378/87 |
| 5,260,982 A | 11/1993 | Fujii et al. | 378/87 |
| 5,313,511 A | 5/1994 | Annis et al. | 378/87 |
| 5,420,905 A | 5/1995 | Bertozzi | 378/88 |
| 5,430,787 A | 7/1995 | Norton | 378/87 |
| 5,442,678 A | 8/1995 | Dinsmore et al. | 378/137 |
| 5,504,796 A | 4/1996 | Da Silveria et al. | 378/121 |
| 5,548,630 A | 8/1996 | Hell et al. | 378/137 |
| 5,642,394 A | 6/1997 | Rothschild | 378/57 |
| 5,682,412 A | 10/1997 | Skillicorn et al. | 378/98.6 |
| 5,696,806 A | 12/1997 | Grodzins et al. | 378/86 |
| 5,712,889 A | 1/1998 | Lanzara et al. | 378/19 |
| 5,805,662 A | 9/1998 | Kurbatov et al. | 378/87 |
| 5,841,831 A | 11/1998 | Hell et al. | 378/19 |
| 5,930,326 A | 7/1999 | Rothschild et al. | 378/57 |
| 6,111,974 A | 8/2000 | Hiraoglu et al. | 378/4 |
| RE37,899 E | 11/2002 | Grodzins et al. | 378/86 |
| 7,203,276 B2 | 4/2007 | Arsenault et al. | 378/87 |
| 2001/0046275 A1 | 11/2001 | Hussein | 378/7 |
| 2007/0019788 A1* | 1/2007 | Ledoux et al. | 378/88 |

FOREIGN PATENT DOCUMENTS

| | | |
|---|---|---|
| DE | 197 10 222 | 9/1998 |
| SU | 448413 | 11/1974 |

OTHER PUBLICATIONS

Murphy, E.E., "*A Rising War on Terrorists*", IEEE Spectrum, Nov. 1989, pp. 33-36.

Stein et al., "*Flying Spot X-Ray Imaging Systems*", American Science and Engineering, Inc., ASE-2864, Dec. 1971, pp. 1-17.

Stein et al., "*Flying Spot X-Ray Imaging Systems*", Materials Evaluation, American Society of Nondestructive Testing, vol. XXX, Jul. 1972, pp. 137-148.

Stein, "*X-Ray Imaging with a Scanning Beam*", Radiology, vol. 117, Dec. 1975, pp. 713-716.

Towe et al., "*X-Ray Compton Scatter Imaging Using a High Speed Flying Spot X-Ray Tube*", IEEE Trans. Bromed. Eng. BME-28, Oct. 1981, pp. 717-721.

Tracy, E.J., "*A New X-Ray Scanner to Hinder Hijackers*", Fortune, Apr. 28, 1986, p. 146.

* cited by examiner

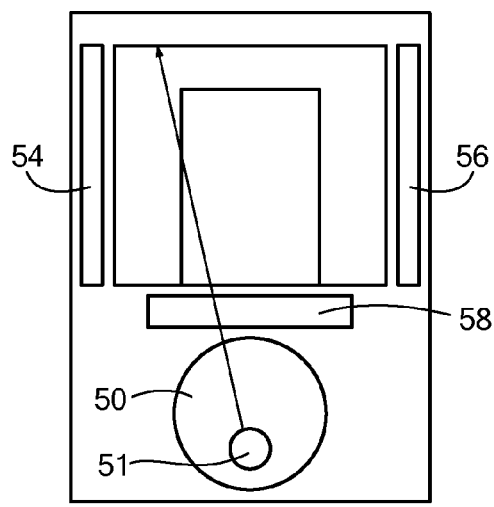
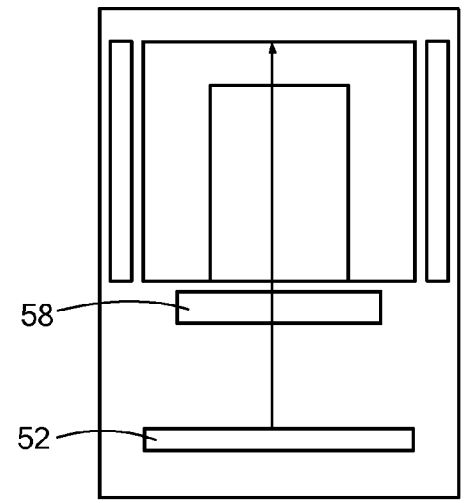
*FIG. 5A*          *FIG. 5B*
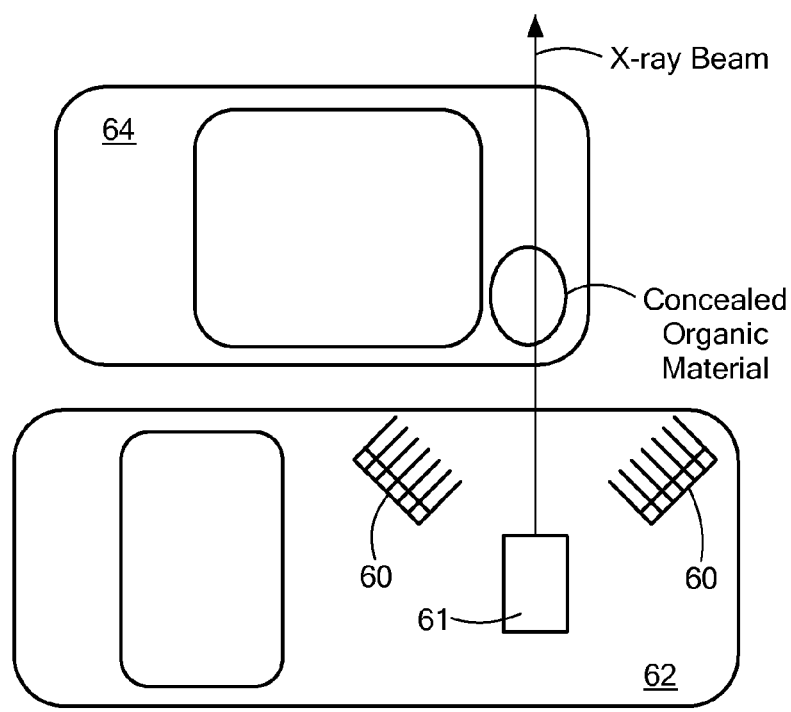
*FIG. 6*

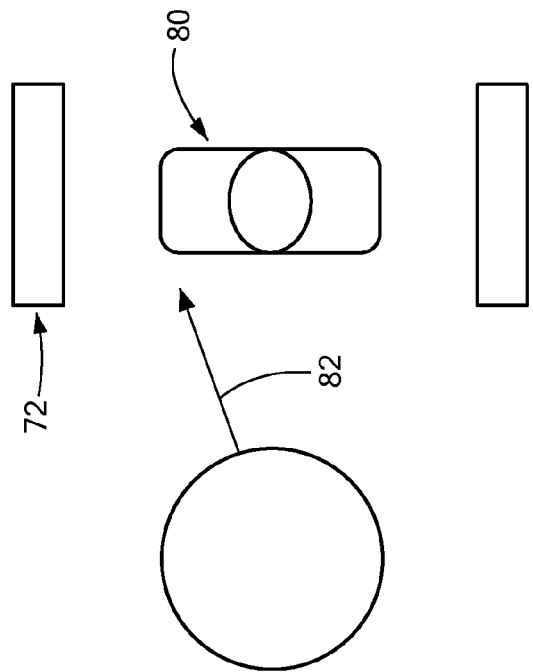
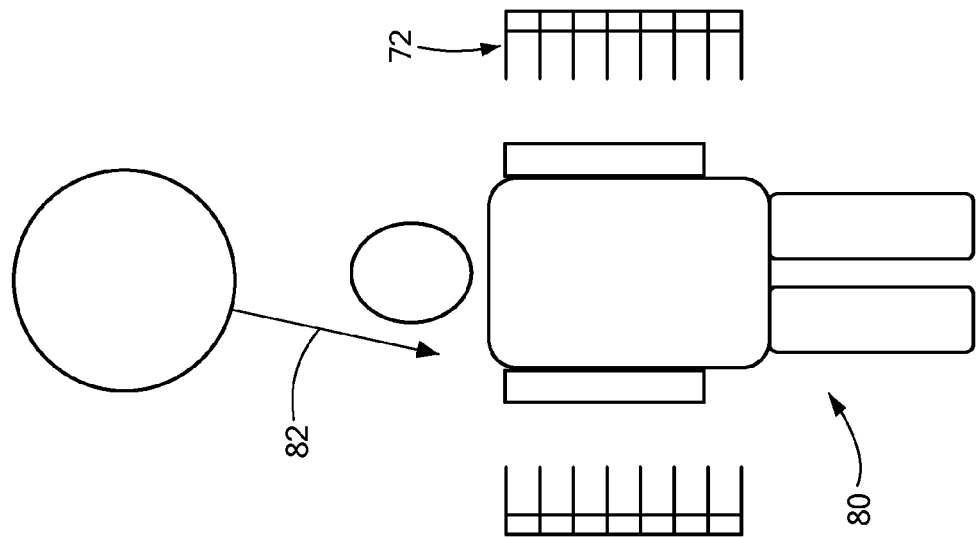
*FIG. 8B*
*FIG. 8A*

SCATTER ATTENUATION TOMOGRAPHY

The present application is a continuation-in-part of U.S. patent application Ser. No. 12/489,620, filed Jun. 23, 2009, which is a continuation of U.S. Ser. No. 11/843,185, which issued on Jun. 23, 2009 as U.S. Pat. No. 7,551,718. Like the two foregoing applications, the present application claims priority from U.S. Provisional Patent Application, Ser. No. 60/823,328, filed Aug. 23, 2006. All of the foregoing prior applications are incorporated herein by reference.

TECHNICAL FIELD

The present invention relates to methods and systems for inspecting objects by means of penetrating radiation, and more particularly, to inspection of objects by simultaneous detection of penetrating radiation scattered into distinct, and possibly opposing, directions.

BACKGROUND OF THE INVENTION

In the period since September, 2001, X-Ray Computerized Tomography (CT) has been used extensively to search for explosive materials concealed in airline baggage. The method works by measuring the "CT number" of objects contained in a suitcase. The CT number is essentially a measure of the attenuation per unit length of x-rays (with a given energy distribution) in the material comprising each object. The CT number can then be used to identify the material. As a matter of definition, "CT number," as used herein and in any appended claims, will refer to a measure of x-ray attenuation, conventionally quoted relative to the attenuation of water.

For organic materials, the CT number is essentially a measure of the electron density of the material, which in turn, is proportional to the mass density. X-Ray CT systems are therefore able to measure the mass density of concealed materials. Explosive materials tend to have mass densities which lie in the range of about 1.2-1.7 grams per cubic centimeter (g/cc). Since x-Ray CT systems reconstruct the contents of a container in three dimensions, the volume of each concealed object is also determined. Combining this information with the density yields the mass of each object. By selecting objects with a minimum size and mass which have a density between 1.2 and 1.7 g/cc, explosive threats can automatically be detected in the container, and an alarm sounded.

Disadvantages of x-Ray CT systems include their size and cost. Both the size and cost arise largely because of the rapidly rotating gantries on which the x-ray source and detector arrays are mounted.

U.S. Pat. No. 5,930,326, entitled "Side Scatter Tomography System," described a method for detecting radiation scattered at essentially 90 degrees out of a raster-scanning pencil beam of x-rays, as detected by one or more arrays of segmented and collimated detector arrays. The intensity distribution of the side-scattered radiation is then used to reconstruct (in three dimensions) the organic objects concealed within a container. That patent is incorporated herein by reference.

SUMMARY OF THE INVENTION

In accordance with preferred embodiments of the present invention, methods and a system are provided for character izing an object on the basis of a determination of mean-free-path of penetrating radiation based upon pair-wise analysis of voxels.

In a preferred embodiment of the invention, an x-ray inspection system is provided for characterizing an object on the basis of a measure of attenuation substantially transverse to an incident beam. The x-ray inspection system has a source for generating an incident beam of penetrating radiation, the incident beam characterized by a propagation direction and an energy distribution, and a plurality of detector elements disposed about the beam of penetrating radiation. The x-ray inspection system has a processor input adapted to receive a first detector signal characterizing radiation scattered from a first voxel, and to receive a second detector signal characterizing radiation scattered from a second voxel, and a processor adapted to determine material composition based upon a calculated attenuation of scattered penetrating radiation, in a direction substantially transverse to the incident beam of penetrating radiation, between the first voxel and the second voxel.

In other embodiments of the invention, the x-ray inspection system may also have a conveyor for moving the object relative to the incident beam, as well as a beam steerer, such as a moving shutter, for varying an orientation of the incident beam relative to the object. The detector elements may be disposed distally or proximally to the object with respect to the incident beam, as well as to the side of the object, and may be collimated. They may have fields of view capable of being steered independently relative to the object, and the source and the plurality of detector elements may be rotated about one or more axes relative to the object.

In further embodiments of the invention, the incident beam may be a pencil beam or a fan beam, and the energy distribution of the incident beam may be varied temporally. The detector elements may also be energy-selective.

In accordance with another aspect of the present invention, a method is provided for characterizing an object on the basis of a measure of attenuation substantially transverse to an incident beam. The method has steps of:

generating an incident beam of penetrating radiation, the incident beam characterized by a propagation direction and an energy distribution;

detecting radiation scattered by a first pair of distinct voxels illuminated by the incident beam;

detecting radiation scattered by a second pair of distinct voxels illuminated by the incident beam;

receiving a first detector signal characterizing radiation scattered from a first voxel and a second detector signal characterizing radiation scattered from a second voxel of each of the first and second pairs of voxels; and determining material composition based upon a calculated attenuation of scattered penetrating radiation, in a direction substantially transverse to the incident beam of penetrating radiation, between the first voxel and the second voxel of each pair of voxels.

In alternate embodiments of the invention, the method may have further steps of moving the object relative to the incident beam or varying an orientation of the incident beam relative to the object. The detector elements may also be steered independently relative to the object. Other embodiments involve rotating the source and the plurality of detector elements relative to the object, and temporally varying energy characteristics of the incident beam.

BRIEF DESCRIPTION OF THE DRAWINGS

The foregoing features of the invention will be more readily understood by reference to the following detailed description taken with the accompanying drawings:

FIGS. 5A and 5B depict systems scanning baggage and small parcels in accordance with embodiments of the invention;

FIG. 6 depicts a system in which the scatter detectors are disposed to one side of the inspected object, as in a mobile inspection unit;

FIGS. 8A and 8B show embodiments of the present invention for inspection of personnel in which the source of penetrating radiation is disposed, respectively, above (or below), and in a horizontal plane with respect to, an inspected subject;

Figure 14:
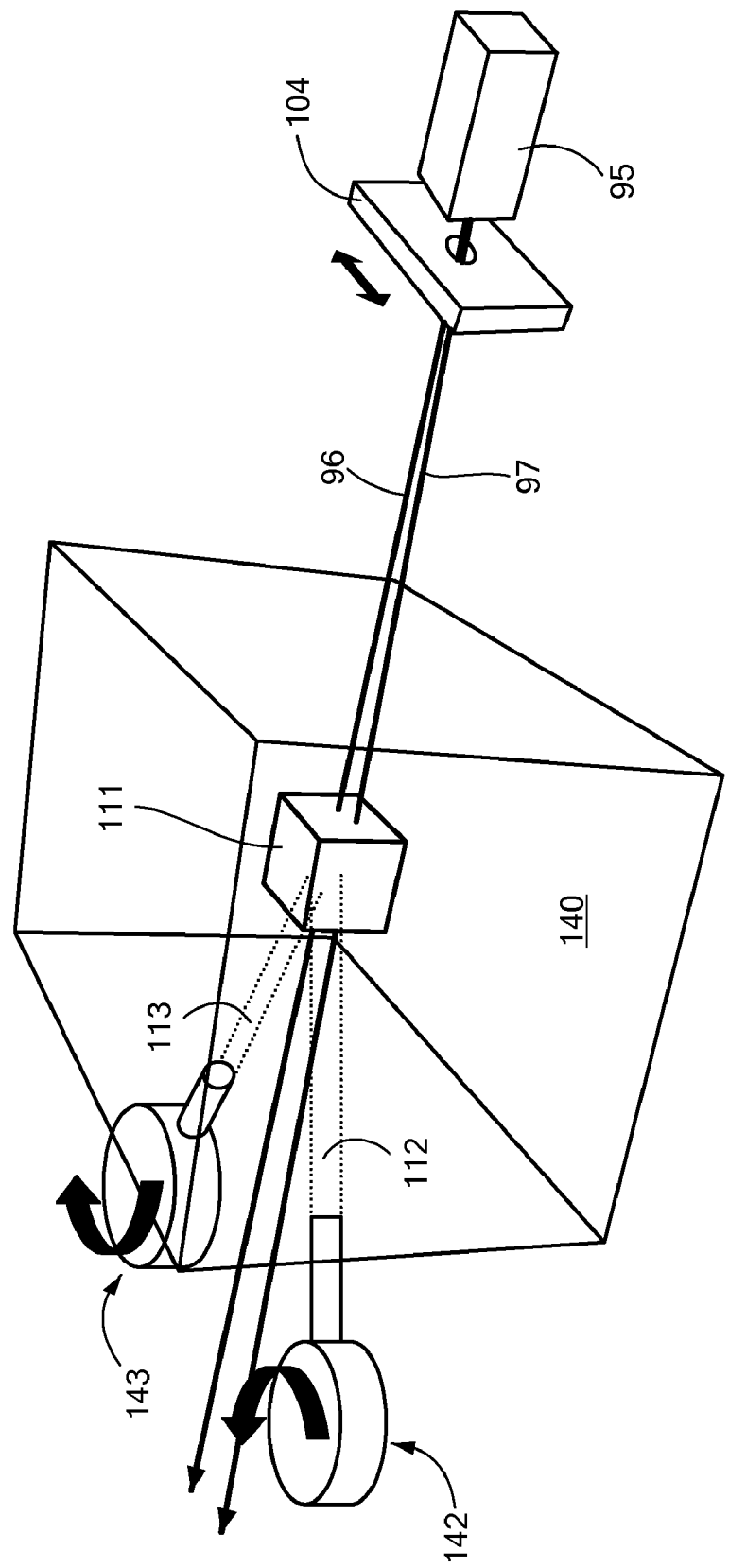
Figure 15A:
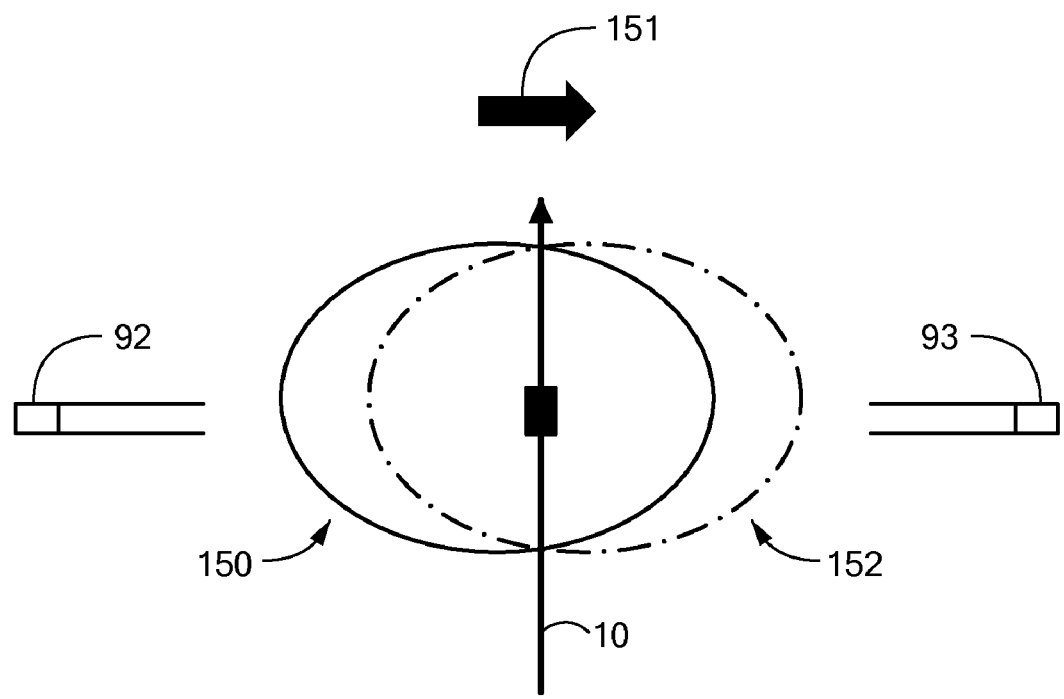
Figure 15B:
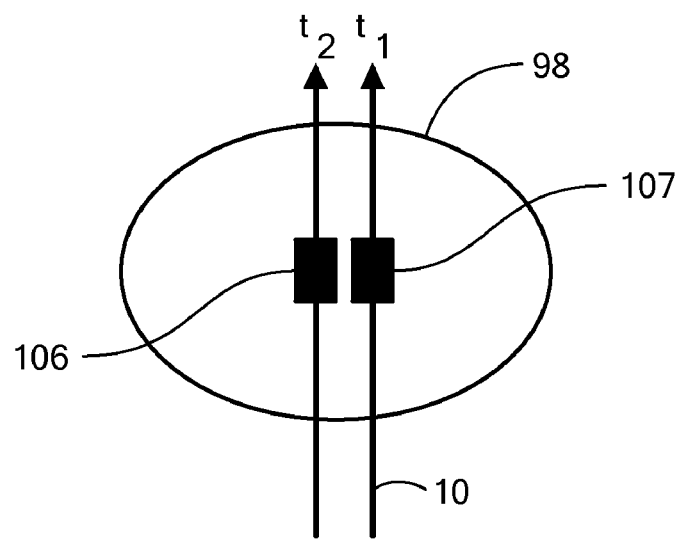
Figure 16A:
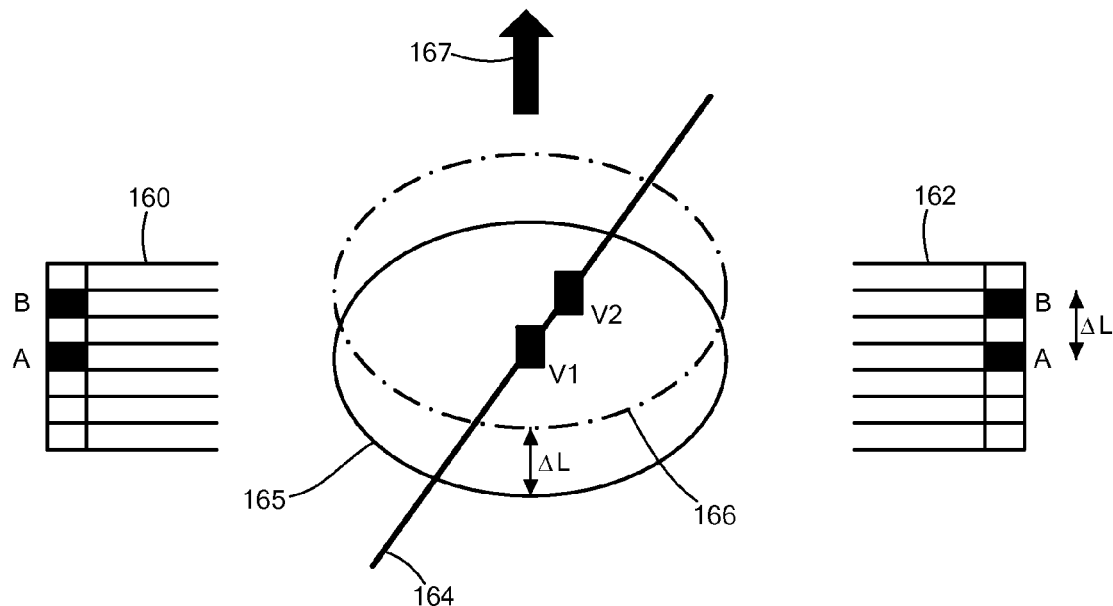
Figure 16B:
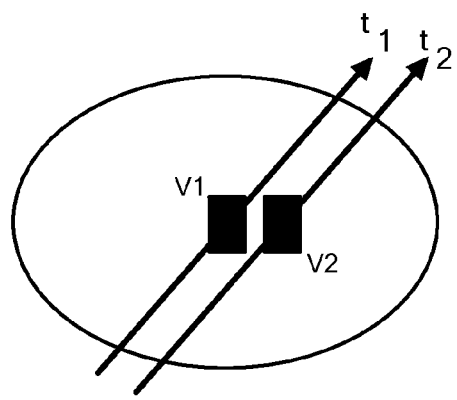

for typical inspection energies as a function of scattering angle;

FIG. 14 is a schematic depiction of embodiments of the present invention applied to the inspection of cargo containers;

FIGS. 15A and 15B depict embodiments of the present invention in which the inspected object is translated relative to a fixed beam substantially transverse to the direction of translation; and FIGS. 16A and 16B depict embodiments of the present invention in which the inspected object is translated relative to an angled incident beam.

DETAILED DESCRIPTION OF EMBODIMENTS OF THE INVENTION

The current invention builds upon the teachings of U.S. Pat. No. 5,930,326 by describing a simple and elegant method for determining a much more accurate measurement of the density of concealed organic objects. In accordance with preferred embodiments of the present invention, the sidescatter distribution is detected in two detector arrays. The method allows for a full three-dimensional reconstruction of the organic contents of the container, along with the more accurate density determination than could be obtained using the methods taught in U.S. Pat. No. 5,930,326.

As now described with reference to FIG. 1, a novel technique referred to herein as Scatter Attenuation Tomography (SAT), generally, looks at the fall-off, in the scattered radiation, from a raster-scanning x-ray beam as the beam moves deeper into an object of interest.

It is to be noted that while the present description refers to an incident beam 10 of penetrating radiation as an x-ray beam, it is to be understood that any beam of penetrating radiation falls within the ambit of the present invention. Thus, the beam may include x-rays, or gamma rays, neutrons, etc. The energy distribution of incident beam 10 may be varied temporally.

Figure 1:
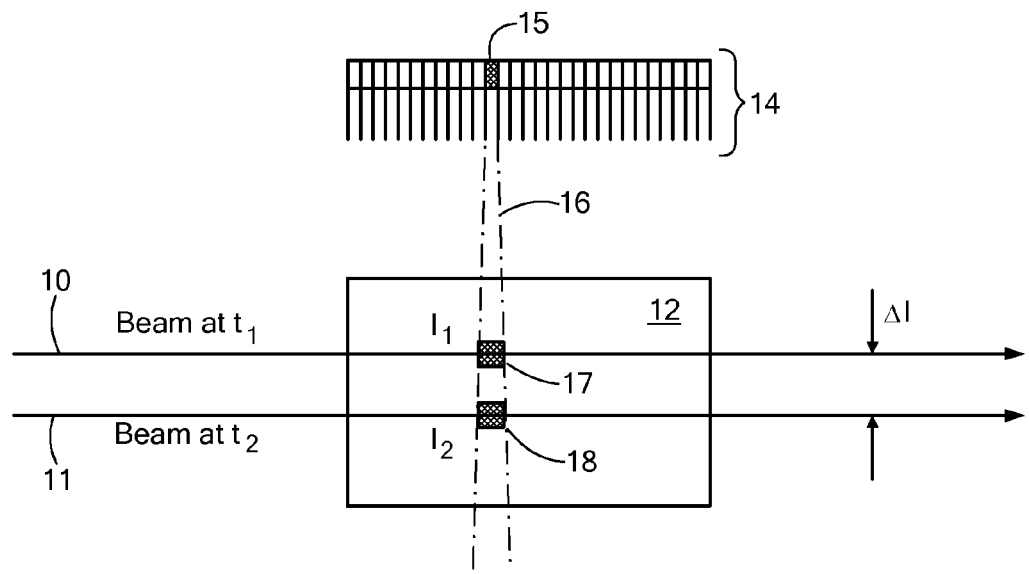
FIG. 1 depicts the principle of operation of a Scatter Attenuation Tomography system in accordance with embodiments of the present invention.

In FIG. 1, the raster scanning x-ray beam 10 comes in from the left and passes through a block 12 of material. At times $t_1$ and $t_2$, x-ray beam 10 is characterized by intensity $I_1$ and $I_2$, respectively, and instantaneous positions are designated by numerals 10 and 11 in FIG. 1. A segmented scatter detector array 14 is located above the organic material, and each detector element 15 in array 14 is collimated such that its field of view 16 for detecting scattered radiation is directly below it, or, equivalently, such that its field of view is substantially perpendicular to the propagation direction of the incident beam 10.

As used herein and in any appended claims, "substantially perpendicular" or "substantially transverse" to the propagation direction of the incident beam refers to any direction having a vector component that is not coaxial with, or parallel to, the propagation direction of the incident beam.

One of the detector elements 15 is highlighted, and at times $t_1$ and $t_2$ it detects scattered radiation emitted from volume elements 17 and 18, respectively, contained within material 12. The ratio of the strengths $S_1$ and $S_2$ of the scattered radiation detected in the $i^{th}$ detector element at times $t_1$ and $t_2$ is given by:

$$S_2/S_1 = (I_2/I_1) \cdot A, \quad \text{Eqn. 1}$$

where A is an attenuation factor characterizing the scattered radiation in the material over the distance $\Delta l$ separating the two beams.

As evident to persons of ordinary skill in the art, the attenuation A may be suitably normalized or scaled. Moreover, A may be expressed, equivalently, as a function of various material parameters such as electron density, etc. The attenuation A may additionally be expressed in terms of its explicit energy dependence.

The attenuation factor $A(\Lambda)$ is given by:

$$A(\Lambda) = e^{\Delta l/\Lambda}. \quad \text{Eqn. 2}$$

The mean free path $\Lambda$ is thus readily derived once the attenuation factor is known, and $1/\Lambda$, which represents the attenuation of the scattered radiation per unit length of material, is known as the "SAT" number of the material. It can be seen that, for the simple geometry shown in FIG. 1, the intensity of the incident x-ray beam at the two voxels is equal ($I_1 = I_2$). In this case, Eqn. 1 yields $$A(\Lambda) = S_2/S_1, \quad \text{Eqn. 3}$$

and therefore the attenuation (and hence the mean free path $\Lambda$ of the radiation in the organic material) can simply be determined from the ratio $S_2/S_1$. Since the mean free path for organic materials is essentially proportional to the mass density, if the material is organic the density of the material can be inferred.

In realistic cases, however, the beam intensities $I_1$ and $I_2$ will not, in general, be equal. This could happen, for example, if material 12 were rotated with respect to the beams 10 and 11, or if an intervening object 20 blocks one of the incident beams as shown in FIG. 2.

Figure 2:
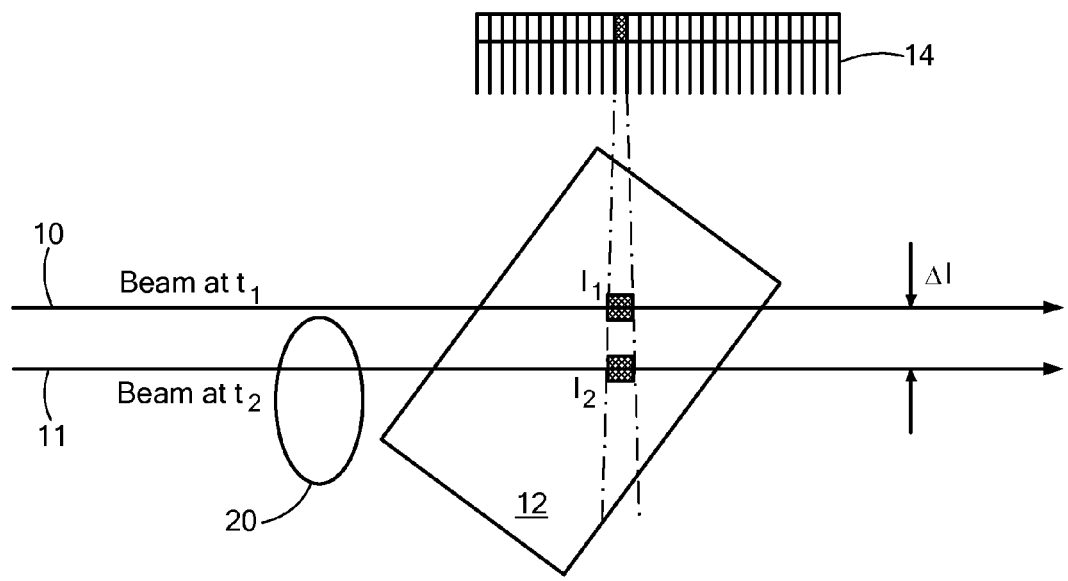
FIG. 2 depicts a geometry in which an intervening object is interposed within one of the incident beams in the system of FIG. 1.

In the case depicted in FIG. 2, since $I_1 \neq I_2$, Eqn. 1 indicates that $A(\Lambda) \neq S_2/S_1$. In fact, since $I_1$ and $I_2$ are not known, the attenuation can not be determined from Eqn. 1.

Figure 3:
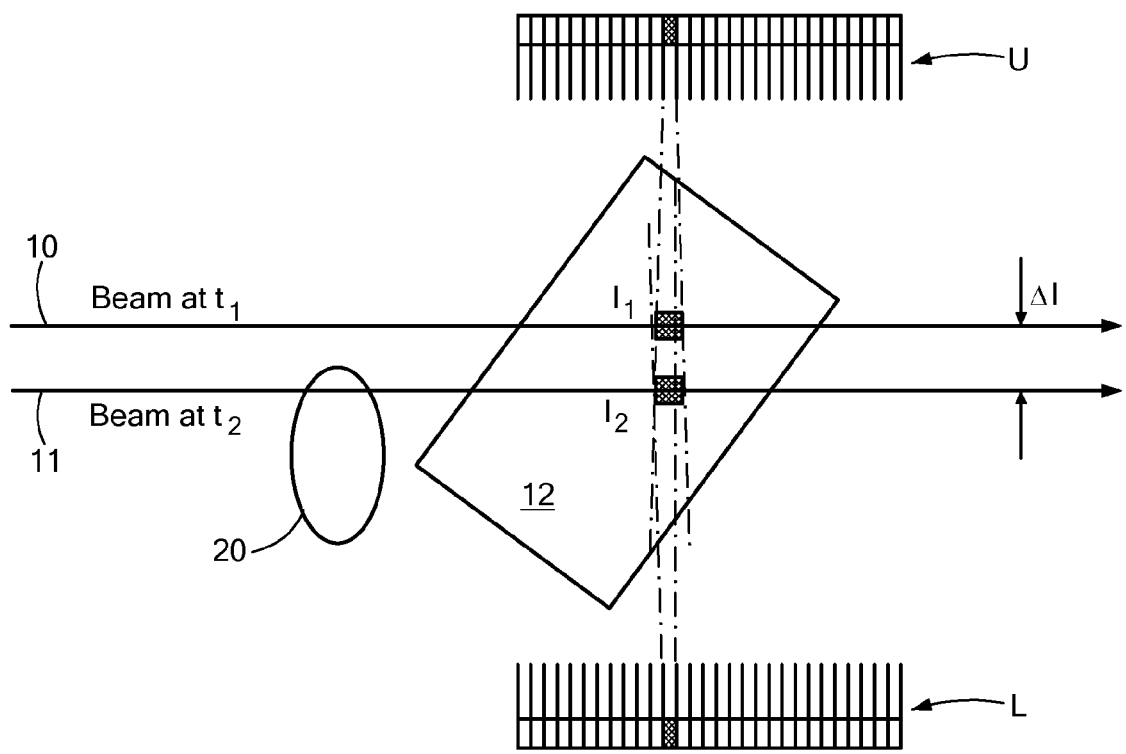
FIG. 3 is a schematic depiction of a preferred embodiment of the present invention in which detector elements of opposing detector arrays detect penetrating radiation sidescattered by an inspected object.

The current invention provides heretofore unavailable solutions to this problem, as now described with reference to FIG. 3. In accordance with preferred embodiments of the present invention, two scatter arrays are provided, an upper scatter array U and a lower scatter array L. It is to be understood, of course, that the reference to upper and lower directions is arbitrary, and arrays of detectors may be disposed in directions that have a vector component substantially parallel to the propagation direction of the incident beam of penetrating radiation are within the scope of the present invention. Thus, the upper and lower detector arrays U and L shown in FIG. 3 may also be labeled left and right arrays, for example.

The ratio of the scatter intensities in the highlighted detector element of the upper detector array at times $t_1$ and $t_2$ is given by:

$$U_2/U_1 = (I_2/I_1) \cdot A(\Lambda) \qquad \text{Eqn. 4}$$

Similarly, the ratio of signals in the lower detector array is given by:

$$L_1/L_2 = (I_1/I_2) \cdot A(\Lambda) \qquad \text{Eqn. 5}$$

Multiplying equations 4 and 5 together yields:

$$A(\Lambda) = \sqrt{[L_1 U_2/(L_2 U_1)]}. \qquad \text{Eqn. 6}$$

Figure 4:
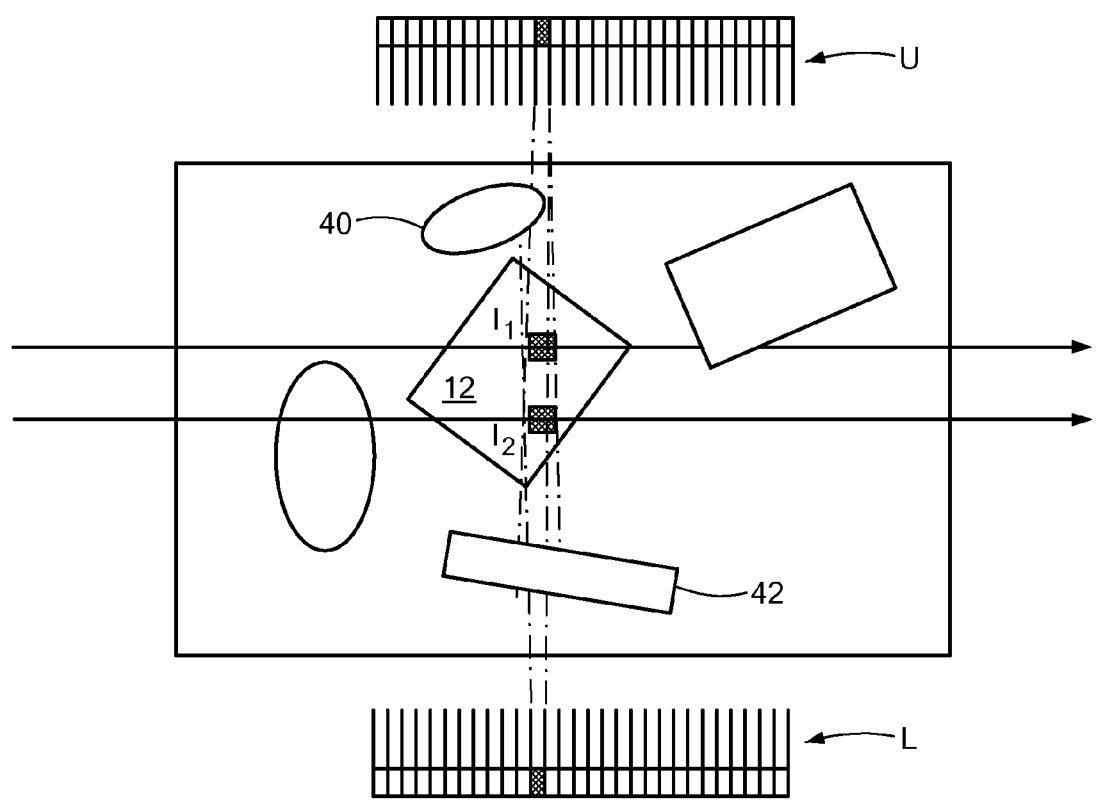
FIG. 4 schematically depicts a scenario in which two surrounding objects are located between an object under inspection and the upper and lower scatter array elements.

It can be seen that the expression for the attenuation factor in Eqn. 6 is now completely independent of the unknown beam intensities $I_1$ and $I_2$, and is independent of how the material 12 is oriented in the bag, or the number of surrounding objects 20 which may be occluding the incident beams. The only requirement is that there exist sufficient intensity in the two incident beams and a sufficiently clear path for the scattered radiation to reach each of the two detector arrays. Another powerful aspect of the invention is that since only ratios of the scatter intensities are used (for example, only the ratios $L_1/L_2$ and $U_2/U_1$ appear in Eqn. 6), the method for calculating the attenuation factor given by Eqn. 6 is immune to any surrounding objects 20 which may attenuate the scattered radiation before it reaches one or both of the detector arrays. This is shown schematically in FIG. 4, where two surrounding objects 40 and 42 are now located between the material 12 under inspection and the upper U and lower L scatter arrays. In this scenario, the attenuation in material block 12 (and hence its density or SAT number) can still be determined, despite the surrounding "clutter" occluding both the incident beams and the scattered radiation.

Exemplary Embodiments of the Invention

The measurement of the attenuation (and therefore the density) of concealed organic materials implied by Eqn. 9 may be implemented in any system that uses a beam of x-rays and which contains two segmented arrays of scatter detectors. Two systems for scanning baggage and small parcels are shown in FIGS. 5A and 5B wherein the source of penetration radiation is comprised, respectively, of a hoop 50 with a scanning aperture about an x-ray tube 51, and a carbon nanotube x-ray source array 52, comprised of discrete elements that may be addressably activated, as described, for example, in co-pending U.S. patent application Ser. No. 11/737,317, filed Apr. 19, 2007, and incorporated herein by reference. In either case, a left detector array 54 and a right detector array 56 are provided, for applications as described above. Additionally, a backscatter detector 58 may be disposed between the source and the inspected object so as to provide additional imaging or material characterization information. The use of a transmission detector to intercept the beam transmitted through the object under inspection is also within the scope of the invention.

Alternatively, the method of the invention may also be used to inspect concealed materials inside a container, where access to the sides of the container (for positioning the detector arrays) is not practical. Such a scheme is shown in FIG. 6, where angled, collimated detector arrays 60 are located in the backward direction, toward x-ray source 61. In the embodiment depicted in FIG. 6 by way of example, x-ray source 61 and detector arrays 60 are mounted in a mobile x-ray backscatter imaging system, on platform 62, for example, that is being used to inspect vehicles 64.

Figure 7:
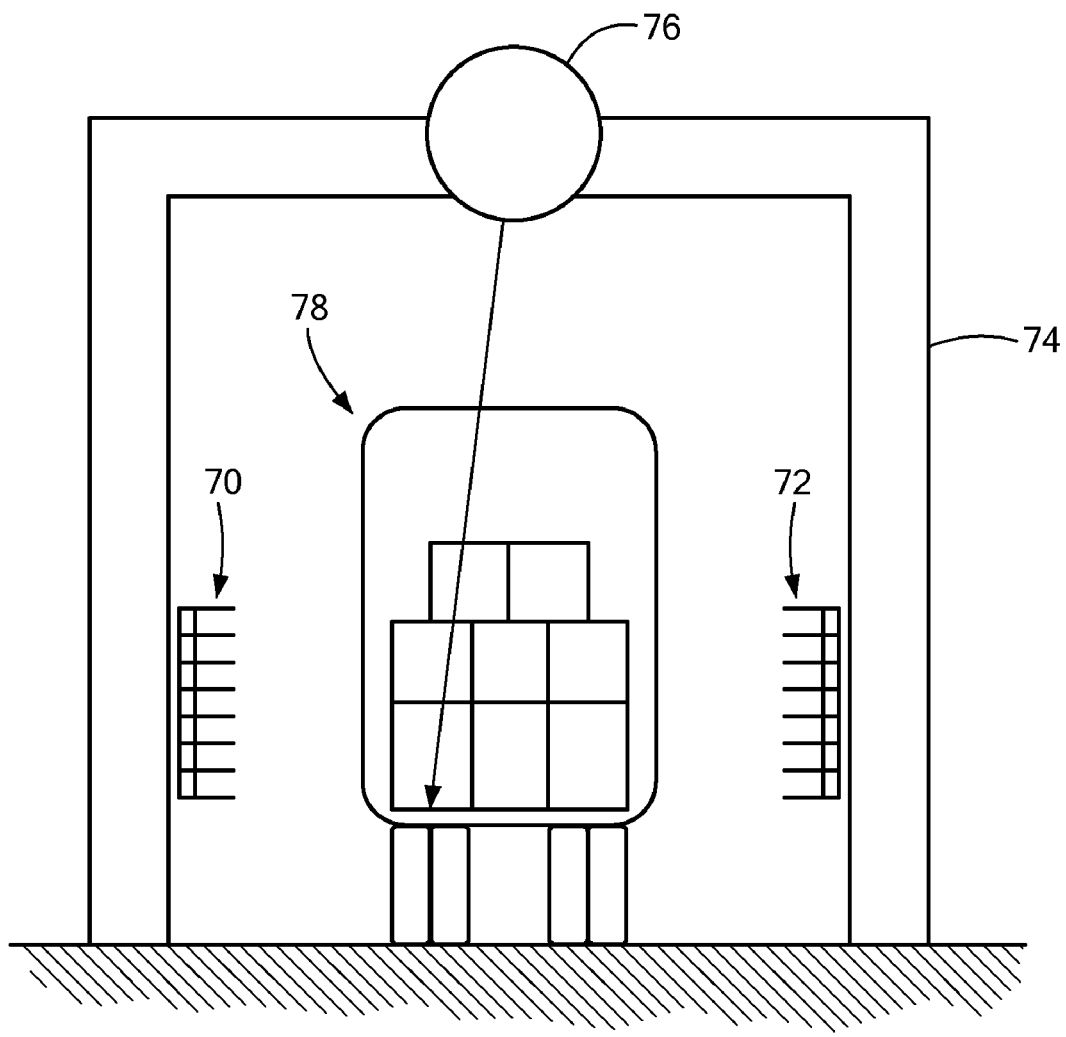
FIG. 7 shows an embodiment of the invention in which the source is disposed above the inspected object, and scatter detector arrays are disposed to either side.

In FIG. 7, an alternative embodiment that scans vehicles or other containers from above is shown. In this case the detectors 70 and 72 are mounted on the sides of the system (which could, for example, be based on a portal 74 or a gantry), while x-ray source 76 is disposed above the inspected object 78.

In FIGS. 8A and 8B, two alternate embodiments for detecting contraband materials carried by people in bags or backpacks, or concealed under clothing are shown. In FIG. 8A, an embodiment is shown wherein a person 80 is scanned by an x-ray beam 82 incident from above. X-ray beam 82 may also be positioned to scan the person from below. FIG. 8B shows an embodiment, depicted schematically from above, where the person 80 is scanned by an x-ray beam 82 which remains essentially in the horizontal plane. In each case, the detector arrays 72 are positioned on either side of the person 80.

Figure 9:
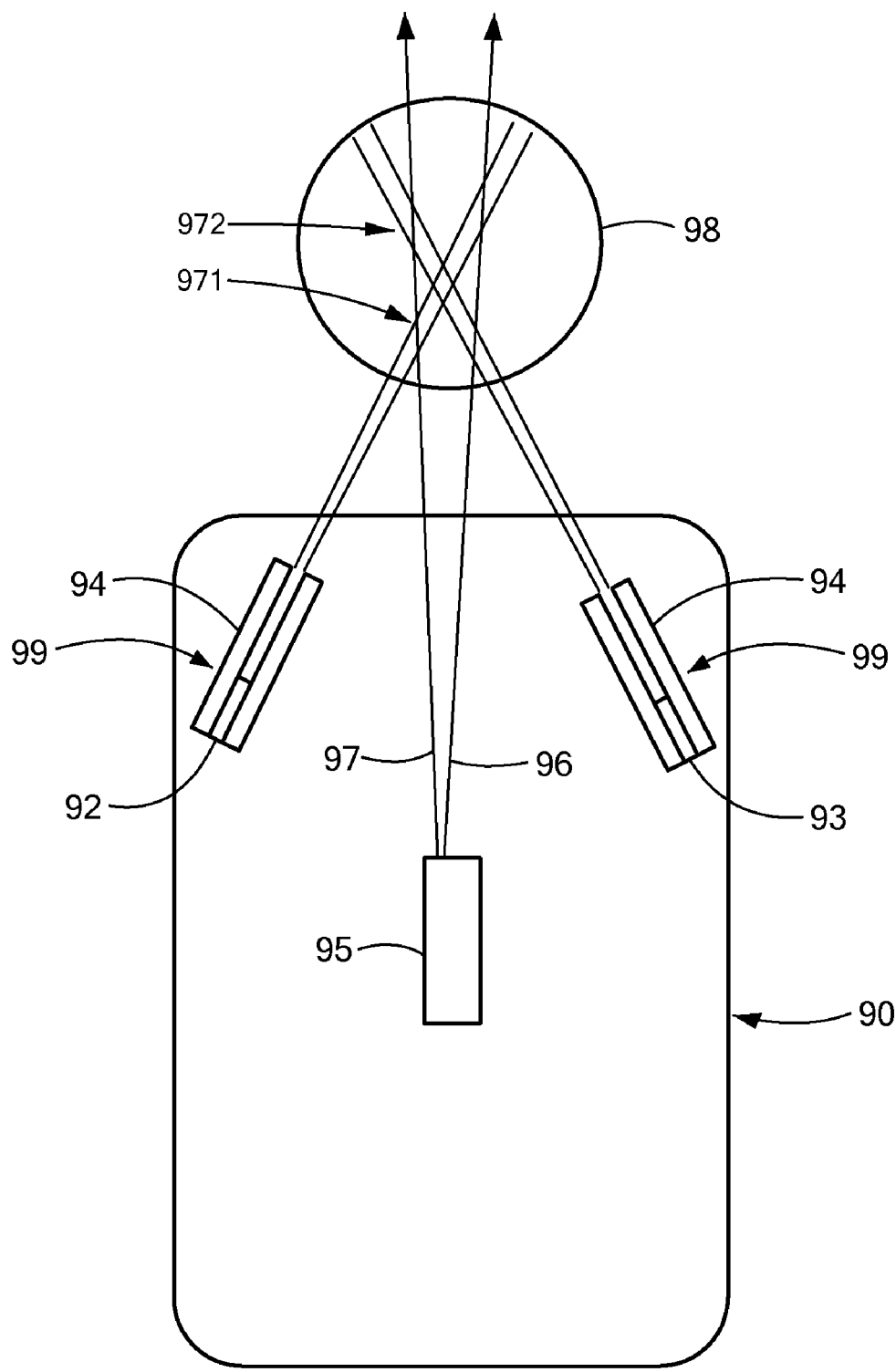
FIG. 9 shows a hand-held inspection device containing two collimated x-ray detectors, and a source emitting a plurality of scanned x-ray beams, in accordance with an embodiment of the present invention.

An alternate embodiment of the invention, which may be used as a hand-held device, is shown in FIG. 9. In this embodiment, a device 90 contains two single collimated x-ray detector units designated generally by numeral 99, each containing a detector 92 and 93 and a collimator 94. By way of example, collimator 94 may be a hollow tube with walls consisting of radiation-absorbing material, such as lead, tungsten, steel, or brass. Additionally, device 90 contains a source 95 emitting a plurality of scanned x-ray beams 96 and 97, as described above, or alternatively, it may emit two fixed beams as shown, with only one being active at any given time. Beams 96 and 97 may be activated, sequentially, by use of shutters, for example. The emitted beams alternate in time, allowing for the attenuation factor of concealed materials 98 to be determined in accordance with Eqn. 6.

More particularly, in each position of the beam, say, the positions designated by beams 96 and 97, a pair of voxels within respective fields of view of detectors 92 and 93 are illuminated. In the case of the beam position designated by beam 97, voxels 971 and 972 are illuminated and within the fields of view of detectors 92 and 93 respectively.

Figure 10:
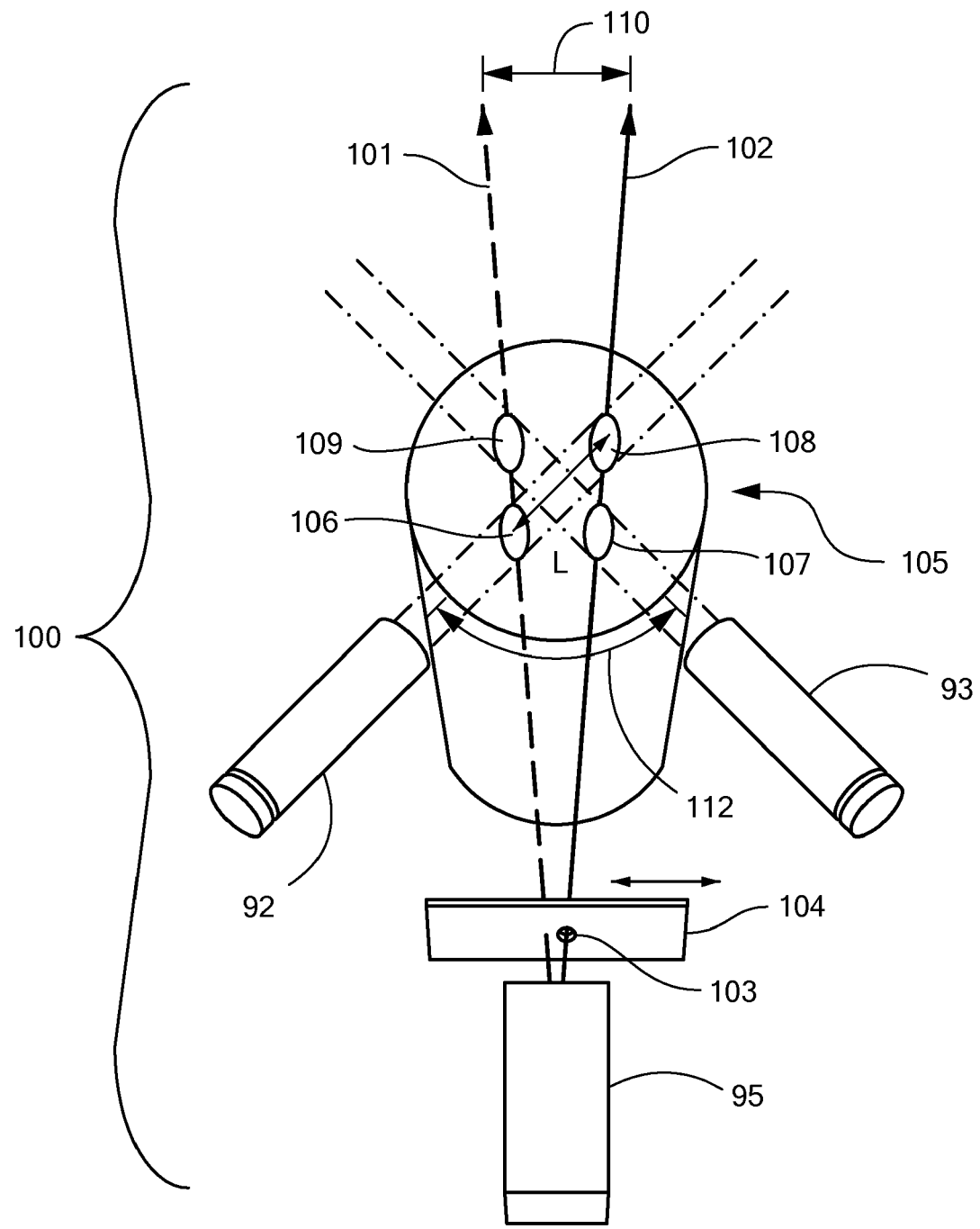
FIG. 10 is a schematic depiction of embodiments of the present invention applied to the inspection of small samples and designed to be implemented in a tabletop system.

This same general geometry as depicted in FIG. 9 may also be implemented in a tabletop system that may be portable, as now described with reference to FIG. 10. Such an inspection system, designated generally by numeral 100, may be advantageously used to inspect bottled liquids at airports in order to detect liquid explosives or liquid explosive precursors that could be used to make explosives beyond the security checkpoint. System 100 may also be used to inspect solid samples.

In one embodiment, the path of a radiation beam 102 can be varied in time by means of a beam steerer. A beam steerer is any mechanism employed for varying the orientation in space of a beam of penetrating radiation. In the embodiment shown, a beam steerer is implemented by simultaneously illuminating two stationary apertures 103, and using a switchable beam selector shutter 104 which sequentially occludes the left and right apertures. In this manner, alternating left and right beams 101 and 102 of radiation sequentially illuminate the sample 105.

Collimated detectors 92 and 93 are shown detecting scatter from sample 105 in the backward direction, but, within the scope of the present invention, the detectors may also be placed in the side or forward directions. X-ray source 95 for a compact system 100 that analyzes small samples is preferably in the range of about 40 kV-60 kV, but higher-energy sources can also be used.

The four voxels 106, 107, 108, 109 that are defined by the field of view of the two detectors 92 and 93 and the two alternating beams 101 and 102 lie within the liquid or solid sample 105 being inspected. In another embodiment of the invention, separation 110 between the two beams or the viewing angle 112 of the detectors can be changed dynamically, depending on the size of the sample being inspected. This allows the separation of the voxels to be maximized, while keeping them all within the sample boundary. If the voxels are too close to one another, data is acquired for a longer time to get a statistically meaningful measurement. By increasing the separation between sampled voxels, the measurement time can be reduced. For example, liquids that need to be inspected at airports can range in size from small 3 ounce bottles to large 2 liter soda bottles. Such a dynamic system allows the voxels to be optimally separated for all the inspected samples.

In accordance with a further embodiment of the invention, energy-resolving detectors, such as cadmium zinc telluride (CZT), may be used to detect the scatter. This allows the SAT number to be measured as a function of the energy of the scattered radiation, allowing a more accurate characterization of the inspected material to be obtained. For example, the SAT number calculated from the higher-energy detected x-rays is more influenced by the density of the material, whereas at the lower energies it is more sensitive to the effective atomic number of the material. A single SAT measurement reflects the combined effects of both density and atomic number, whereas two or more measurements made at different energies allow the individual effects of the two parameters to be better determined, and provides better discrimination between different materials. This is described in more detail in the next section.

Dual or Multi-Energy Embodiment of the Invention

The expression for the attenuation factor given in Eqn. 6, $$A(\Lambda) = \sqrt{[L_1 U_2 / (L_2 U_1)]},$$

enables the mean free path $\Lambda$ of the scattered radiation to be measured for a particular piece of concealed material. By varying the energy of the raster-scanning pencil beam, the mean free path $\Lambda$ of the material can be measured for several different energy ranges of x-rays. Similar information may be obtained by using energy-selective detectors. By analyzing how the mean free path $\Lambda$ of the material changes with x-ray energy, a determination of the approximate effective atomic number Z of the material can be inferred, in addition to the measurement of the material density. For example, the mean free path for higher Z materials will decrease more rapidly with decreasing photon energy, compared with lower Z materials. This is due to the strong dependence of the photoelectric effect (which absorbs x-rays) on the effective atomic number of the material. The photoelectric absorption cross section increases rapidly with the effective atomic number of the material with decreasing x-ray photon energy.

Alternatively, rather than varying the energy of the raster-scanning x-ray beam, energy-sensitive detector elements can be used in the detector arrays. One such example of this includes the use of CdZnTe detectors, which enable the energy of each detected x-ray to be measured. Cuts can then be made on the energies of the detected x-rays, and the attenuation factor given by Eqn. 6 can then be calculated for several different ranges of x-ray energies. This then allows the mean free path of the material to be calculated for several different average x-ray energies, allowing both density and effective atomic number measurements of the material to be made. Having both these measurements allows for a more accurate identification of the material making up the organic object, increasing detection rates and lowering false alarm rates. Note that each of the alternate embodiments of the invention described previously can be extended to include dual or multi-energy operation.

In accordance with certain further embodiments of the invention, material may be identified as a threat substance based on a comparison of a mean free path or SAT number, calculated in accordance with the foregoing teachings, with a table of measured values. A calculated attenuation may be validated by repeat interrogation of a voxel with detector elements of opposing field of view.

Second-Tier SAT System for the Inspection of Suspicious Regions

In yet further embodiments of the invention, a configuration such as that described with reference to FIG. 11 may be applied to the inspection of suspicious regions of a small parcel, piece of baggage, or even a vehicle or cargo container. In order to inspect a suspicious region, the location of the region is determined in three dimensions so that the pairs of voxels described previously can be accurately positioned, ensuring that they are fully contained within the region. A preferred means of locating the region of interest is to use a first inspection system to identify and locate the suspicious region. In one example of a first inspection system, an x-ray computerized tomography (CT) system is used to identify a suspicious region by measuring a density that lies within a predefined range of values, and then accurately provides the location and size of the region to the SAT system. The secondary SAT system is then able to position a combination of the object, beams, and fields of view of the detectors in order to locate the interrogation voxels within the suspicious region. For larger objects such as cargo containers where CT systems would not be practical, a suspicious region may be identified, for example, in a dual-energy transmission image, and its location could be inferred by using one or more additional views of the container obtained at different viewing angles.

Figure 11:
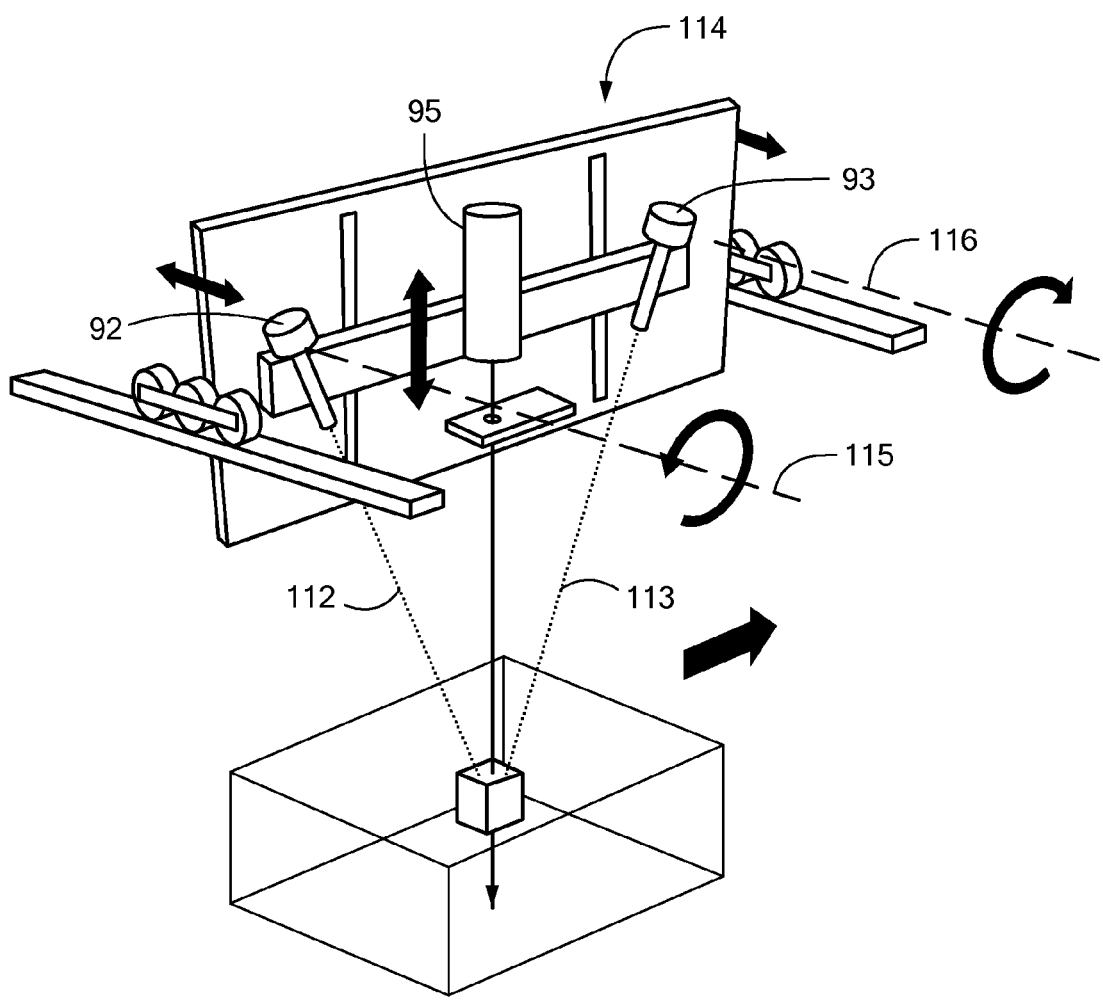
FIG. 11 is a schematic depiction of embodiments of the present invention applied to the inspection of baggage, parcels, or small containers.

An embodiment of a secondary SAT system suited for baggage inspection is shown in FIG. 11. In this example, the location of a suspicious region 111 has previously been determined from a primary inspection (such as a CT system) and the interrogation voxels (106, 107, 108, 109, shown in FIG. 10) of the secondary system are positioned at the center of the region 111 by moving the SAT detectors 92 and 93 and x-ray source assembly 95 in the horizontal and vertical directions. While FIG. 11 shows that the x-ray source 95 and fields of view 112 and 113 of the detectors remain fixed with respect to one another, each detector and its collimator may also rotate about axes 115 and 116 that are horizontal in the figure, thus allowing suspicious regions located at different depths in the piece of baggage to be inspected without the entire source/detector assembly 114 having to be moved in the vertical direction.

Application of SAT to Cargo Screening

Figure 12:
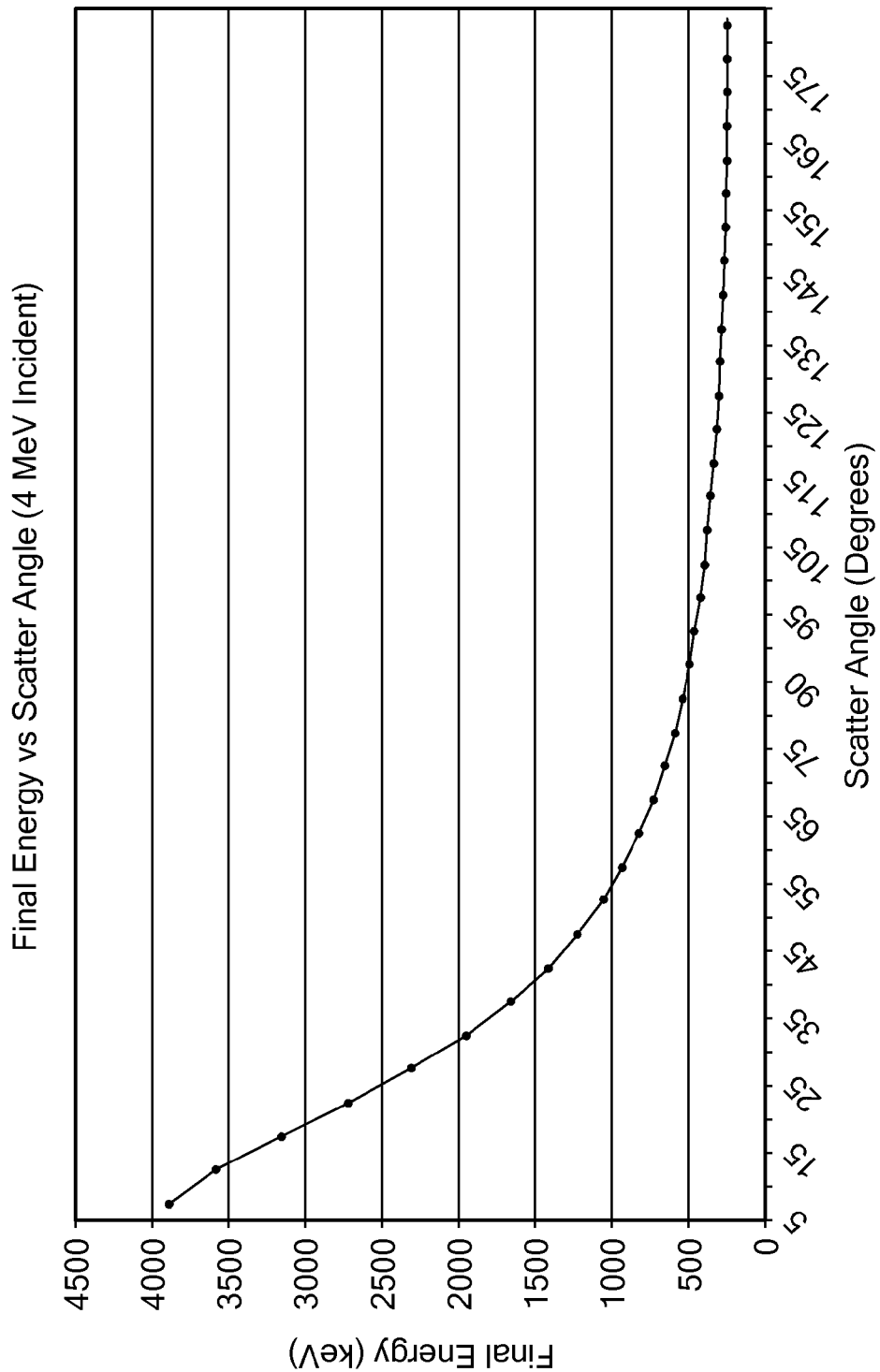
FIG. 12 is a plot of the energy of a scattered photon as a function of scattering angle for a 4-MeV incident photon.
Figure 13:
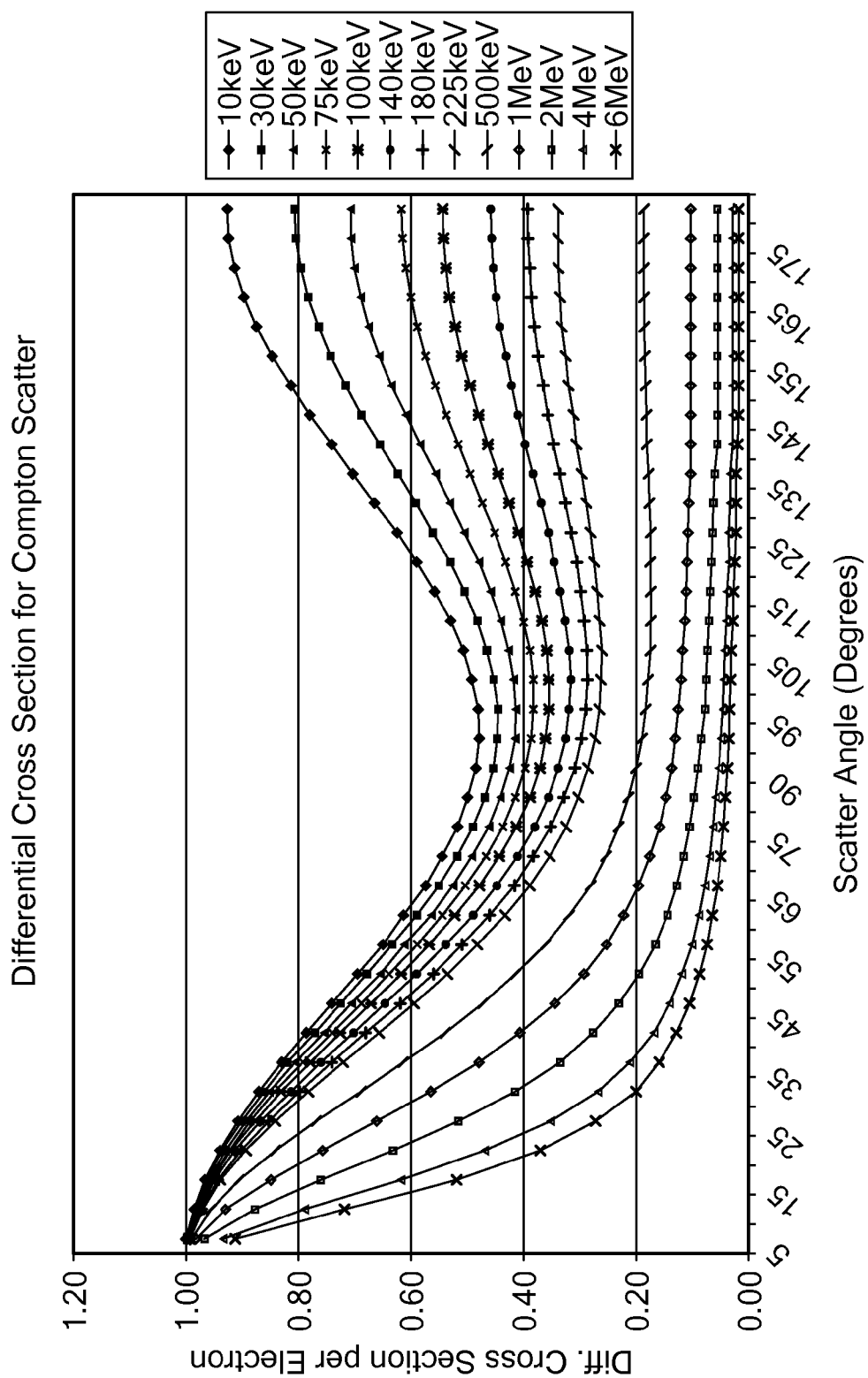
FIG. 13 is a plot of the differential Compton scattering cross section $$\frac{d\sigma}{d\theta}$$

One of the difficulties encountered in using x-ray scatter techniques in the backward or sideways directions for cargo screening is the relatively low energy of the scattered x-ray photons. The energy of a scattered photon as a function of scattering angle is plotted in FIG. 12 for a 4-MeV incident photon. For example, a 4 MeV photon back-scattered at 160 degrees from the incident direction will have an energy of only about 250 keV. At 90 degrees, the energy is still only about 450 keV, and in dense cargos, the scattered photons will not be able to penetrate the contents and be detected. In the forward direction, however, a 4 MeV photon scattered at 45 degrees has an energy of 1.2 MeV, and has a much greater chance of penetrating the cargo. At 30 degrees, this increases to almost 2 MeV. In addition, the probability of scattering, which is described by the Klein-Nishina cross section equation, is much greater for forward-scatter angles, with the differential cross section, $$\frac{d\sigma}{d\theta}$$

plotted for typical energies as a function of scattering angle in FIG. 13. For example, for 4 MeV incident photons, the cross section for scattering into detectors at 45 degrees in the forward direction is 5 times higher than for scattering into detectors at 160 degrees in the backwards direction, and about 3 times higher than for scattering 90 degrees into detectors in the sideways direction.

When applying the SAT concept to cargo, therefore, it is advantageous to place the pair of collimated scatter detectors in the forward direction, instead of in the backward or sideways directions. A schematic diagram of SAT applied to a cargo container 140 is shown in FIG. 14. Note that there is a trade-off between choosing the most forward angle to maximize the probability of detecting the scattered photons (i.e. maximizing the scatter cross section and the energy of the scattered photons), and limiting the size of the interrogation volume (or "voxel") 111 which is defined by the intersection of the detector field of view (FOV) and the x-ray beam. The width of the voxel is determined by the detector collimation and the width of the beam, but the depth of the voxel (along the beam direction) is proportional to $1/\sin\theta$, where $\theta$ is the angle of the detector FOV with respect to the incident beam 96. An angle of $30<\theta<50$ is preferred for most applications. As an example of these tradeoffs, the interrogation volume 111 for detectors placed at 45 degrees has a depth about 42% smaller than when the detectors are placed at 30 degrees, but the mean energy of the scattered radiation is about 40% lower, and the probability of scatter is reduced by almost a factor of two compared with 30 degrees.

Referring further to FIG. 14, several features of the embodiment may be pointed out, as follows:

A. The location of the interrogation volume (voxel) 111 in cargo container 140 is selected by varying the angle of the two collimated SAT detectors 142 and 143 simultaneously. This will also change the scatter angle of the detected radiation, depending on where voxel 111 is located. For voxels located towards the source-side of the container, the scatter angles will be smaller, and for voxels on the side distal to the source, the scatter angles will be closer to 90 degrees. This is fortunate, because the scattered photons from these voxels will have less overlying material to penetrate in order to reach the detectors, and can therefore afford to have a lower mean energy.

B. The x-ray beams 96 and 97 can be switched from left to right in the horizontal plane using a shutter 104 as shown. Alternatively, the beams can also be switched in a plane oriented in another direction, such as the vertical plane, with the field of view of the detectors also lying in this plane.

C. The x-ray source 95 can be optimized in energy and intensity, depending on the threat materials which need to be identified. For large or densely packed cargo containers, 4 MeV to 10 MeV sources are typically required. A preferred energy is around 6 MeV, where good penetration is balanced with reasonably low radiation dose to the environment, and neutron production from the x-ray target is minimal.

Application of SAT to the Detection of Special Nuclear Materials

As used herein, "Special Nuclear Materials" refer to those materials so defined by law, namely under the Atomic Energy Act of 1954, which is incorporated herein by reference. At x-ray energies above about 1 MeV, the Compton effect dominates over the photoelectric effect, even for materials with very high atomic numbers, such as lead, uranium, and plutonium (Z=82, 92, and 94, respectively). The SAT technique, which measures the linear attenuation coefficient of scattered radiation, is therefore mostly sensitive to the density of the material being probed, so long as the scattered radiation is substantially above about 1 MeV. Practically speaking, scattered photons with energies below this level will rapidly get absorbed in high-Z material anyway, implying that high-energy x-ray beams with energies of at least several MeV are preferred for the SAT technique for these materials, in that SAT relies on the detection of scattered photons.

Because of the large separation in density between Special Nuclear Materials ($\rho=19$ and $\rho=20$ g/cc for uranium and plutonium, respectively) and the densest benign materials commonly found in cargo (typically steel with $\rho=8$ g/cc), SAT is very effective at detecting small quantities of SNM. For example, even if the density is measured with an error of ±20%, a high probability of detection can be achieved with a very low false alarm rate.

Typically, smaller quantities of SNM are easier to detect than very large quantities, as self-attenuation of the scattered radiation in the material becomes an issue for volumes larger than about 40 kg. Table 1 shows simulated results for cubes of aluminum, steel, lead, and uranium placed in the center of a 36 inch cube of clothing. The SAT number is shown for two energy ranges of detected x-rays: below and above 1 MeV. It can be seen that the SAT number for x-rays above 1 MeV are the most useful for discriminating high-Z materials from lower-Z materials. From these numbers, it is apparent that SAT may be useful for discriminating very dense materials (such as SNM) from common benign materials such as aluminum or steel.

TABLE 1

SAT numbers taken at 6 MeV for various materials concealed in cargo.

| Material | Size (inches) | $N_{SAT}$(Low) | $N_{SAT}$(High) |
| --- | --- | --- | --- |
| Aluminum | 3.5 | 0.63 | 0.63 |
|  | 4.0 | 0.61 | 0.62 |
|  | 10.0 | 0.40 | 0.49 |

TABLE 1-continued

SAT numbers taken at 6 MeV for various materials concealed in cargo.

| Material | Size (inches) | $N_{SAT}$(Low) | $N_{SAT}$(High) |
|---|---|---|---|
| Steel | 3.5 | 1.4 | 1.2 |
|  | 4.0 | 1.3 | 1.1 |
|  | 10.0 | 0.52 | 0.79 |
| Lead | 3.5 | 1.4 | 1.5 |
|  | 4.0 | 1.3 | 1.4 |
|  | 5.0 | 1.1 | 1.1 |
| Uranium | 3.5 | 1.6 | 2.4 |
|  | 4.0 | 1.0 | 2.1 |

Stratagems for Creating Pair-Wise Illuminated Voxels

Referring to FIG. 15A, it is to be understood that varying the propagation direction of an illuminating beam 10 is tantamount, for purposes of illuminating pairs of voxels for implementing the present invention, to moving the inspected object 150 in a direction 151 with respect to a fixed beam 10. Numeral 150 denotes the inspected object at a first moment of time, while numeral 152 denotes the same object at a later moment of time. Two representative detectors 92 and 93 are shown.

Referring to FIG. 15B, while the absolute position in space of the illuminated voxels 106, 107 relative to the beam 10 remains fixed, the relative position of the illuminated voxels within the object 150 changes as the object is moved. The resulting change in signals in a pair of collimated detectors as the object moves a predefined distance through the beam can be used to calculate the SAT number of the material comprising the object. The object may be moved through the beam using a conveyor belt, for example, or by driving or towing a vehicle or container through the system.

Similarly within the scope of the invention, as shown in FIG. 16A, voxels V1 and V2 may be illuminated and analyzed pair-wise by means of a collimated array of detectors 160 and 162 and an angled beam of radiation 164. In FIG. 16A, a fan beam of radiation 164 (coming out of the plane of the diagram) is oriented at an angle to the direction of motion 167 of object 165 through the beam 164 (in this case about 45 degrees). At time $t_1$, the object is at the position represented by numeral 165, and opposing detector elements labeled A are used to form the illuminated voxel labeled V1. At time $t_2$, after the object (now represented by numeral 166) has moved a distance $\Delta L$ through the beam, the detector elements labeled B are used to form the illuminated voxel labeled V2. As shown in FIG. 16B, the resulting two voxels V1 and V2 are shifted relative to the object being inspected, and for a beam angled at 45 degrees, the separation distance between the illuminated voxels is equal to $\Delta L$.

All of the heretofore described embodiments of the invention are intended to be merely exemplary and numerous variations and modifications will be apparent to those skilled in the art. All such variations and modifications are intended to be within the scope of the present invention as defined in any appended claims.

What is claimed is:

1. An x-ray inspection system for characterizing an object on a basis of a measure of attenuation substantially transverse to an incident beam, the x-ray inspection system comprising:
    a source for generating an incident beam of penetrating radiation, the incident beam characterized by a propagation direction and an energy distribution;
    a plurality of detector elements disposed about the beam of penetrating radiation, each detector element characterized by a field of view, each detector element generating a detector signal;
    a processor input adapted to receive a first detector signal characterizing radiation scattered from a first voxel, and to receive a second detector signal characterizing radiation scattered from a second voxel; and
    a processor adapted to determine material composition based upon a calculated attenuation of scattered penetrating radiation, in a direction substantially transverse to the incident beam of penetrating radiation, between the first voxel and the second voxel.

2. An x-ray inspection system in accordance with claim 1, further comprising a conveyor for moving the object relative to the incident beam.

3. An x-ray inspection system in accordance with claim 1, further comprising a beam steerer for varying an orientation of the incident beam relative to the object.

4. An x-ray inspection system in accordance with claim 3, wherein the beam steerer includes a moving shutter.

5. An x-ray inspection system in accordance with claim 1, wherein the plurality of detector elements are disposed distally to the object with respect to the incident beam.

6. An x-ray inspection system in accordance with claim 1, wherein the plurality of detector elements are disposed proximally to the object with respect to the incident beam.

7. An x-ray inspection system in accordance with claim 1, wherein at least one of the plurality of detector elements is disposed to a side of the object with respect to the incident beam.

8. An x-ray inspection system in accordance with claim 1, wherein the plurality of detector elements are collimated.

9. An x-ray inspection system in accordance with claim 1, wherein the plurality of detector elements are characterized by fields of view capable of being steered independently relative to the object.

10. An x-ray inspection system in accordance with claim 1, wherein each of the source and the plurality of detector elements may be rotated about an axis relative to the object.

11. An x-ray inspection system in accordance with claim 1, wherein the incident beam is a pencil beam.

12. An x-ray inspection system in accordance with claim 1, wherein the incident beam is a fan beam.

13. An x-ray inspection system in accordance with claim 1, wherein the plurality of detector elements are energy-selective.

14. An x-ray inspection system in accordance with claim 1, wherein the energy distribution of the incident beam of penetrating radiation is varied temporally.

15. A method for characterizing an object on a basis of a measure of attenuation substantially transverse to an incident beam, the method comprising:
    generating an incident beam of penetrating radiation, the incident beam characterized by a propagation direction and an energy distribution;
    detecting radiation scattered by a first pair of distinct voxels illuminated by the incident beam;
    detecting radiation scattered by a second pair of distinct voxels illuminated by the incident beam;
    receiving a first detector signal characterizing radiation scattered from a first voxel and a second detector signal characterizing radiation scattered from a second voxel of each of the first and second pairs of voxels; and
    determining material composition based upon a calculated attenuation of scattered penetrating radiation, in a direction substantially transverse to the incident beam of penetrating radiation, between the first voxel and the second voxel of each pair of voxels.

16. A method in accordance with claim 15, further comprising moving the object relative to the incident beam.

17. A method in accordance with claim 15, further comprising varying an orientation of the incident beam relative to the object.

18. A method in accordance with claim 15, further comprising steering the plurality of detector elements independently relative to the object.

19. A method in accordance with claim 15, further comprising rotating a source generating the incident beam and a plurality of detector elements detecting the scattered radiation relative to the object.

20. A method in accordance with claim 15, further comprising temporally varying energy characteristics of the incident beam.

* * * * *